US006678241B1

(12) United States Patent
Gai et al.

(10) Patent No.: US 6,678,241 B1
(45) Date of Patent: Jan. 13, 2004

(54) FAST CONVERGENCE WITH TOPOLOGY SWITCHING

(75) Inventors: Silvano Gai, Vigliano d'Asti (IT); Keith McCloghrie, San Jose, CA (US); Merwyn B. Andrade, San Jose, CA (US)

(73) Assignee: Cisc Technology, Inc., San Jose, CA (US)

( * ) Notice: Subject to any disclaimer, the term of this patent is extended or adjusted under 35 U.S.C. 154(b) by 0 days.

(21) Appl. No.: 09/452,344

(22) Filed: Nov. 30, 1999

(51) Int. Cl.[7] .............................................. G01R 31/08
(52) U.S. Cl. ....................................... 370/216; 370/244
(58) Field of Search ................................ 370/216, 217, 370/218, 219, 220, 221, 225, 254, 255, 256, 400, 401, 408, 244, 242, 252, 395.53; 709/220, 221, 252, 241

(56) References Cited

U.S. PATENT DOCUMENTS

| | | | |
|---|---|---|---|
| 4,811,337 A | 3/1989 | Hart ............................ | 370/256 |
| 4,922,486 A | 5/1990 | Lidinsky et al. .............. | 370/427 |
| 5,018,137 A | 5/1991 | Backes et al. ................ | 370/401 |
| 5,115,433 A | 5/1992 | Baran et al. .................. | 370/400 |
| 5,138,615 A | 8/1992 | Lamport et al. ............. | 370/400 |
| 5,150,360 A | 9/1992 | Perlman et al. .............. | 370/402 |
| 5,233,604 A | 8/1993 | Ahmadi et al. .............. | 370/238 |
| 5,265,092 A | 11/1993 | Soloway et al. .............. | 370/238 |
| 5,280,480 A | 1/1994 | Pitt et al. ..................... | 370/256 |
| 5,329,527 A | 7/1994 | Ujihashi et al. ............. | 370/397 |
| 5,357,508 A | 10/1994 | Le Boudec et al. .......... | 370/397 |
| 5,394,402 A | 2/1995 | Ross ............................ | 370/402 |
| 5,420,862 A | 5/1995 | Perlman ....................... | 370/401 |
| 5,444,702 A | 8/1995 | Burnett et al. ............... | 370/254 |
| 5,490,139 A | 2/1996 | Baker et al. .................. | 370/312 |
| 5,491,690 A | 2/1996 | Alfonsi et al. ............... | 370/404 |
| 5,570,359 A | 10/1996 | Nguyen ....................... | 370/401 |
| 5,577,033 A | 11/1996 | Chang et al. ................. | 370/402 |
| 5,581,552 A | 12/1996 | Civanlar et al. ............. | 370/396 |

(List continued on next page.)

OTHER PUBLICATIONS

U.S. patent application Ser. No. 09/208,175, Mahajan et al.
IBM Technical Disclosure Bulletin, V37, #10, Oct. 1994, "Addressing Source Routing in an ATM Emulated LAN", pp. 75–80.
IBM Technical Disclosure Bulletin, V39, #8, Aug. 1996, "Method for Improving Network Availability with Redundant Network Servers", pp. 195–196.
D. Delaney and M. Seaman, *Single or Multiple Filtering Databases*, May 8, 1997.

(List continued on next page.)

*Primary Examiner*—Douglas Olms
*Assistant Examiner*—Brian Nguyen
(74) *Attorney, Agent, or Firm*—Cesari and McKenna, LLP; Michael R. Reinemann

(57) ABSTRACT

A system for rapidly switching at least one virtual local area network (VLAN) from a first loop-free topology to a second loop-free topology in response to a failure within the first loop-free topology. Each VLAN has one "logical" VLAN which represents the network entities organized into the VLAN and a set of "physical" VLANs each having its own VLAN designation. For each physical VLAN, a different loop-free topology is defined, although only one physical VLAN is "active" at any given time. Messages associated with the logical VLAN are tagged with the designation of the currently active physical VLAN, and forwarded along its loop-free topology. Upon detecting a failure in the loop-free topology, the logical VLAN is rapidly switched to the loop-free topology defined by a second, back-up physical VLAN. Following the switch messages associated with the logical VLAN are tagged with the designation of this back-up VLAN and are forwarded along its loop-free topology.

18 Claims, 7 Drawing Sheets

U.S. PATENT DOCUMENTS

| | | | | |
|---|---|---|---|---|
| 5,590,118 | A | | 12/1996 | Nederlof ..................... 370/218 |
| 5,600,638 | A | | 2/1997 | Bertin et al. ................ 370/351 |
| 5,600,644 | A | | 2/1997 | Chang et al. ............... 370/404 |
| 5,606,669 | A | | 2/1997 | Bertin et al. ................ 709/223 |
| 5,636,216 | A | | 6/1997 | Fox et al. ................... 370/402 |
| 5,636,217 | A | | 6/1997 | Moelard ..................... 370/338 |
| 5,649,108 | A | | 7/1997 | Spiegel ....................... 709/241 |
| 5,687,167 | A | | 11/1997 | Bertin et al. ................ 318/767 |
| 5,699,347 | A | | 12/1997 | Callon ........................ 370/238 |
| 5,732,072 | A | | 3/1998 | Thamer et al. ............. 370/255 |
| 5,740,171 | A | | 4/1998 | Mazzola et al. ............ 370/392 |
| 5,742,604 | A | | 4/1998 | Edsall et al. ................ 370/401 |
| 5,761,435 | A | | 6/1998 | Fukuda et al. .............. 709/238 |
| 5,764,636 | A | | 6/1998 | Edsall ......................... 370/401 |
| 5,790,808 | A | | 8/1998 | Seaman ...................... 709/223 |
| 5,805,593 | A | | 9/1998 | Busche ....................... 370/396 |
| 5,838,660 | A | | 11/1998 | Croslin ....................... 370/216 |
| 5,838,663 | A | | 11/1998 | Elwalid et al. ............. 370/233 |
| 5,854,899 | A | | 12/1998 | Callon et al. ............... 709/238 |
| 5,878,232 | A | * | 3/1999 | Marimuthu ................. 709/249 |
| 6,032,194 | A | | 2/2000 | Gai et al. .................... 709/239 |
| 6,188,694 | B1 | * | 2/2001 | Fine et al. ................... 370/402 |
| 6,202,114 | B1 | | 3/2001 | Dutt et al. ................... 710/311 |
| 6,219,739 | B1 | | 4/2001 | Dutt et al. ................... 710/311 |
| 6,356,551 | B1 | * | 3/2002 | Egbert ........................ 370/389 |
| 6,373,826 | B1 | * | 4/2002 | Russell et al. .............. 370/256 |
| 6,560,236 | B1 | * | 5/2003 | Varghese et al. ........... 370/401 |

OTHER PUBLICATIONS

S. Horowitz, *Dual–Layer Spanning Tree*, (A Spanning Tree Proposal for IEEE 802.IQ), May 14, 1997.

Lucent Technologies Inc.'s Initial Disclosure of Prior Art Under civil Local Rule 16–7, U.S. District Court for the Northern District of California, C.A. No. C98–20836JW (PVT) ENE, Nov. 18, 1998.

M. Seaman, *High Availability Spanning Tree*, Rev. 1.1, Oct. 26, 1998.

J. Hart, *Extending the IEEE 802.1 MAC Bridge Standard to Remote Bridges*, IEEE Network, Jan. 1998, vol. 2, No. 1, pp. 10–15.

B. Yener, et al., *Fault–Tolerant Convergence Routing*, Copyright 1994 IEEE.

R. Perlman, *Interconnections: Bridges and Routers*, Copyright 1992 by Addison–Wesley Publishing Company, Inc., pp. 54–64.

IEEE P802. 1d Draft Standard for Local Area Networks MAC (Media Access Control) Bridges: Technical and Editorial Corrections, Copyright 1997 IEEE, pp. 1–10, 85–122 and 151–158.

*Configuring VTP, VLANs, VLAN Trunks and VMPS*, Cisco Systems Inc., Published Jun. 9, 1998,

* cited by examiner

FAST CONVERGENCE WITH TOPOLOGY SWITCHING

CROSS-REFERENCE TO RELATED APPLICATIONS

This application is related to the following co-pending U.S. Patent Applications: U.S. patent application Ser. No. 08/998,412 entitled, METHOD AND APPARATUS FOR RAPIDLY RECONFIGURING COMPUTER NETWORKS filed Dec. 24, 1997, now U.S. Pat. No. 6,032,194; and U.S. patent application Ser. No. 09/208,175 entitled, VALUE-ADDED FEATURES FOR THE SPANNING TREE PROTOCOL, filed Dec. 9, 1998.

FIELD OF THE INVENTION

The present invention relates generally to computer networks, and more specifically, to a method and apparatus for quickly identifying and selecting loop-free topologies in computer networks.

BACKGROUND OF THE INVENTION

A computer network typically comprises a plurality of interconnected entities. An entity may consist of any device, such as a computer or end station, that "sources" (i.e., transmits) or "sinks" (i.e., receives) messages such as data frames. A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs may be interconnected by point-to-point links, microwave transceivers, satellite hook-ups, etc. to form a wide area network ("WAN") or intranet that may span an entire country or continent.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information among a plurality of LANs or end stations. Typically, the bridge or switch is a computer and includes a plurality of ports that couple the device to the LANs or end stations. Ports used to couple switches to each other are generally referred to as a trunk ports, whereas ports used to couple a switch to LANs, end stations, servers, etc. are generally referred to as access ports. The switching function includes receiving data from a sending entity at a source port and transferring that data to at least one destination port for forwarding to the receiving entity. Switches and bridges typically store address information for use in reaching particular network entities in a block of memory called a filtering database.

Additionally, most computer networks are either partially or fully meshed. That is, they include redundant communications paths so that a failure of any given link or device does not isolate any portion of the network. The existence of redundant links, however, may cause the formation of circuitous paths or "loops" within the network. Loops are highly undesirable because data frames may traverse the loops indefinitely. Furthermore, because switches and bridges replicate (i.e., flood) frames whose destination port is unknown or which are directed to broadcast or multicast addresses, the existence of loops may cause a proliferation of data frames that effectively overwhelms the network.

Spanning Tree Algorithm

To avoid the formation of loops, most bridges and switches execute a spanning tree algorithm which allows them to calculate an active network topology that is loop-free (i.e., a tree) and yet connects every pair of LANs within the network (i.e., the tree is spanning). The Institute of Electrical and Electronics Engineers (IEEE) has promulgated a standard (the 802.1D standard) that defines a spanning tree protocol to be executed by 802.1D compatible devices. In general, by executing the IEEE spanning tree protocol, bridges elect a single bridge to be the "root" bridge. Since each bridge has a unique numerical identifier (bridge ID), the root is typically the bridge with the lowest bridge ID. In addition, for each LAN coupled to more than one bridge, only one (the "designated bridge") is elected to forward frames to and from the respective LAN. The designated bridge is typically the one closest to the root. Each bridge also selects one port (its "root port") which gives the lowest cost path from that bridge to the root. The root ports and designated bridge ports are selected for inclusion in the active topology and are placed in a forwarding state so that data frames may be forwarded to and from these ports and thus onto the corresponding paths or links of the network. Ports not included within the active topology are placed in a blocking state. When a port is in the blocking state, data frames will not be forwarded to or received from the port. A network administrator may also exclude a port from the spanning tree by placing it in a disabled state. The forwarding and blocking states are stable spanning tree port states in that a port may remain in these states indefinitely (i.e., there is no prescribed limit on the time that can be spent in either of these states).

To obtain the information necessary to run the spanning tree protocol, bridges exchange special messages called configuration bridge protocol data unit (BPDU) messages. BPDU messages carry information used to execute the spanning tree protocol. For example, BPDU messages carry a root identifier, a root path cost, a bridge identifier, and a port identifier, among other information. The root identifier is the numeric identifier for the bridge assumed to be the root and the bridge identifier is the numeric identifier of the bridge sending the BPDU. The root path cost is a value representing the cost to reach the assumed root from the port on which the BPDU is sent and the port identifier is the numeric identifier of the port on which the BPDU is sent.

Upon start-up, each bridge initially assumes itself to be the root and generates and transmits BPDU messages accordingly. Upon receipt of a BPDU message from a neighboring device, the message's contents are examined and compared with similar information (e.g., assumed root and lowest root path cost) stored by the receiving bridge. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDU messages are not forwarded by bridges, the identifier of the root is eventually propagated to and adopted by all bridges as described above, allowing them to select their root port and any designated port(s).

In order to adapt the active topology to failures, bridges associate a timer with the BPDU information stored for each port. If the age of any stored BPDU information reaches a so-called maximum age, the corresponding BPDU information is considered to be stale and is discarded by the bridge. Normally, each bridge replaces its stored BPDU information every hello time, which is the frequency at which the root sends new BPDU messages, thereby preventing it from being discarded and maintaining the current active topology. If a bridge stops receiving BPDU messages on a given port (indicating a possible link or device failure), it will continue to increment the respective message age value until it reaches the maximum age threshold. The bridge will then discard the stored BPDU information and proceed to re-calculate the root, root path cost and root port by transmitting BPDU messages utilizing the next best information it has. The maximum age value used within the bridged network is typically set by the root, which enters a selected value in its BPDU messages. Neighboring bridges copy this value into their BPDU messages, thereby propagating the selected value throughout the network. The default maximum age value under the IEEE standard is twenty seconds.

As BPDU information is up-dated and/or timed-out and the active topology is re-calculated, ports may transition from the blocking state to the forwarding state and vice versa. That is, as a result of new BPDU information, a previously blocked port may learn that it should be in the forwarding state (e.g., it is now the root port or a designated port). Rather than transition directly from the blocking state to the forwarding state, ports transition through two or more intermediary or transitory states, such as a listening state and a learning state. The time spent in each of the listening and the learning states is called the forwarding delay. As ports transition between the blocked and forwarding states, entities may appear to move from one port to another. To prevent bridges from distributing messages based upon incorrect information, bridges quickly age-out and discard the "old" information in their filtering databases. More specifically, upon detection of a change in the active topology, bridges transmit Topology Change Notification Protocol Data Unit (TCN-PDU) messages toward the root. The format of the TCN-PDU message is described in the IEEE 802.1D standard and is well-known. The TCN-PDU message is propagated hop-by-hop until it reaches the root which confirms receipt of the TCN-PDU by setting a topology change flag in all BPDUs subsequently transmitted by the root for a period of time. Other bridges, receiving these BPDUs, note that the topology change flag has been set, thereby alerting them to the change in the active topology. In response, bridges significantly reduce the aging time associated with their filtering databases. Information contained in the filtering databases is thus quickly discarded.

Although the spanning tree protocol is able to maintain a loop-free topology despite network changes and failures, re-calculation of the active topology can be a time consuming and processor intensive task. For example, re-calculation of the spanning tree following the failure of a link or an intermediate device can take thirty seconds or more. First, the corresponding BPDU information must time-out, which typically takes twenty seconds. The affected ports may then transition through the listening and learning states, remaining in each state for approximately fifteen seconds. Thus, it takes approximately fifty seconds or more to recover from a failure. During this time, message delivery is often delayed because ports in the listening and learning states do not forward or receive messages. Such delays can have serious consequences for time sensitive applications, such as voice or video applications, which demand consistently low latency. In particular, these applications may stop or shutdown in response to such disruptions.

Virtual Local Area Networks

A computer network may also be segregated into a series of logical network segments. U.S. Pat. No. 5,394,402, issued Feb. 28, 1995 (the "'402 Patent"), for example, discloses an arrangement for associating any port of a switch with any particular segregated network group. Specifically, according to the '402 Patent, any number of physical ports of a particular switch may be associated with any number of groups within the switch by using a virtual local area network (VLAN) arrangement that virtually associates the port with a particular VLAN designation. These VLAN designations are also associated with the messages that are received on these ports. In particular, every time a message is received on a given access port, the VLAN designation for that port, as stored in a memory portion of the bridge, is associated with the message. For convenience, each VLAN designation is often associated with a different color, such as red, blue, green, etc.

In many cases, it may be desirable to interconnect a plurality of these switches in order to extend the VLAN associations of ports in the network. By extending VLAN associations across multiple devices, those entities having the same VLAN designation function as if they are all part of the same LAN segment. Message exchanges between parts of the network having different VLAN designations are specifically prevented in order to preserve the boundaries of each VLAN segment or domain. In addition to the '402 Patent, the IEEE has also promulgated the 802.1Q standard for Virtual Bridged Local Area Networks. The IEEE's 802.1Q standard supports VLANs and defines a specific VLAN-tagged message format for transmission on trunks.

FIG. 1 is a partial block diagram of a tagged data frame 100 that is compatible with the 802.1Q standard. Frame 100 includes a header portion 102, which may be compatible with the Media Access Control (MAC) sub-layer, and data portion 104. The header 102, moreover, includes a plurality of fields. In particular, header 102 includes a MAC destination address (MAC DA) field 106 that identifies the network entity to which the frame 100 is to be delivered and a MAC source address (MAC SA) field 108 that identifies the network entity that created the frame 100. Following the MAC SA field 108 is a VLAN identifier (VLAN ID) or tag field 110 that specifies the VLAN that has been associated with the frame 100. In particular, VLAN ID field 110 is loaded with a numeric identifier that corresponds to the VLAN designation associated with the port on which message 100 was received. This tag, moreover, is examined and understood by 802.1Q compatible devices, and the last device along the route removes the tag before transmitting the frame to the target end station.

Several alternatives exist for overlaying spanning trees or active topologies on these virtually segregated network groups or domains. The IEEE 802.1Q standard, for example, specifies a single spanning tree within the respective bridged network regardless of the number of VLAN designations that have been defined. With this approach, the bridges exchange conventional BPDUs so as to define a single loop-free topology for the network. Thus, all data frames, regardless of their VLAN associations, may be forwarded to and received from ports in the forwarding state, while no data frames may be forwarded to or received from blocked parts.

An alternative to the 802.1Q standardized approach is to define a separate spanning tree for each VLAN defined within the bridged network. This per VLAN spanning tree architecture is described at IEEE 802.1s, which is the Multiple Spanning Trees Draft Supplement to the IEEE 802.1Q Virtual Bridged Local Area Network Standard. With this approach, bridges and switches exchange BPDUs, each of which is tagged with a VLAN designation just like data frames. These tagged BPDUs are then processed by the switches so as to define a separate active network topology or spanning tree for each VLAN designation. Thus, for a given trunk port, messages associated with one VLAN designation may be forwarded and received whereas messages associated with a second VLAN designation may be blocked. That is, the port is forwarding for the first VLAN but blocking for the second. Regardless of the spanning tree approach that is adopted, however, re-calculation of the spanning tree following a link or device failure can take a significant amount of time in networks supporting VLANs, and these delays can have deleterious consequences for time sensitive applications.

SUMMARY OF THE INVENTION

Briefly, the invention relates to a system and method for rapidly switching at least one virtual local area network (VLAN) from a first loop-free topology to a second loop-free topology in response to detecting a failure within the first loop-free topology. Each VLAN defined for a computer network is configured to include one "logical" VLAN which logically represents the entities organized into the defined VLAN, and a plurality of "physical" VLANs each associated with its own VLAN designation. For each physical VLAN, moreover, a different loop-free topology is defined within the network. However, at any given time, only one of the physical VLANs, and thus only one loop-free topology, will be "active" for its corresponding logical VLAN. Messages associated with the logical VLAN are tagged with the designation of the currently active physical VLAN, and forwarded along that physical VLAN's loop-free topology. According to the invention, upon the detection of a link or other failure in the loop-free topology defined by the currently active physical VLAN, the logical VLAN is rapidly switched to the loop-free topology defined by a second physical VLAN to which the logical VLAN is also associated. More specifically, access ports corresponding to the logical VLAN are re-assigned to the second physical VLAN. Following the switch to the second physical VLAN, subsequent messages associated with the logical VLAN are tagged with the designation of the second physical VLAN, and forwarded along its respective loop-free topology. The physical VLAN which is selected as the new active topology preferably has the affected link blocked so as to be fully spanning. Accordingly, messages associated with the logical VLAN can continue to be forwarded without having to wait for the spanning tree algorithm to be re-calculated. Thus, the network of the present invention suffers little or no delay from failures and, through appropriate selection of the new physical VLAN, loss of connectivity is avoided.

BRIEF DESCRIPTION OF THE DRAWINGS

The invention description below refers to the accompanying drawings, of which.

DETAILED DESCRIPTION OF AN ILLUSTRATIVE EMBODIMENT

Figure 2:
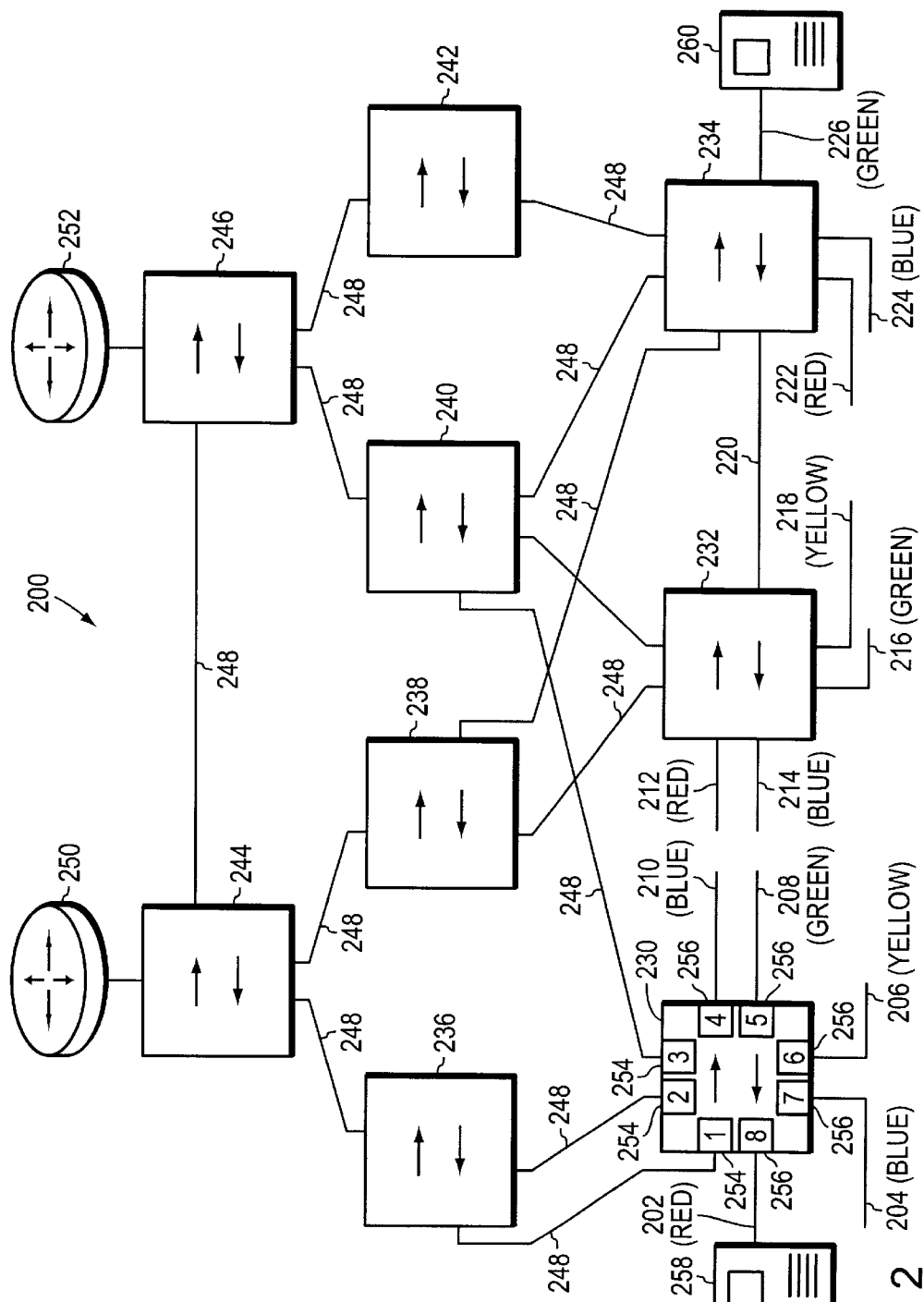
FIG. 2 is a block diagram of a computer network in accordance with the present invention.

FIG. 2 illustrates a computer network 200 in accordance with the present invention. The network 200 includes a plurality of local area networks (LANs) 202–226 each of which is coupled to one or more access switches 230–234. The access switches 230–234 are, in turn, interconnected with each other through a plurality of distribution or backbone switches 236–246. Specifically, the access switches 230–234 and backbone switches 236–246, which may also be referred to as intermediate network devices, may be interconnected by a series of trunks or links 248, such as point-to-point links. Links 248 basically represent communications paths for transporting messages, such as data frames, between various network components. Network 200 further includes two routers 250 and 252 which provide added functionality to the network 200. Routers 250 and 252 are preferably coupled to backbone switches, such as backbone switches 244 and 246.

Each access switch 230–234 and backbone switch 236–246 includes a plurality of ports which, if directly coupled to a LAN 202–226 (or a host, end station, server, workstation, etc.) are referred to as access ports, and if directly coupled to a trunk or link 248 are referred to as trunk ports. Each port at a given switch, moreover, may be identified by a corresponding port number (e.g., port 1, port 2, port 3, etc.). Access switch 230, for example, has three trunk ports 254 (port numbers 1–3) and five access ports 256 (port numbers 4–8). Attached to each LAN 202–226 may be a plurality of network entities, such as hosts, end stations, servers (e.g., file servers, print servers, etc.), workstations, etc. For example, attached to LAN 202 is a first server 258, and attached to LAN 226 is a second server 260. These network entities, moreover, may source or sink messages or data frames to one another over the network 200. Switches 230–246 comprise conventional components and circuitry that allow them to associate specific ports with the hosts, end stations, servers, workstation, routers, etc. that are coupled thereto or otherwise accessible therethrough.

Selected LANs 202–226, and thus the hosts, end stations, servers and workstations attached thereto, may be logically grouped together to form one or more virtual local area networks (VLANs). More specifically, a network administrator may define a plurality of VLANs within network 200. Each VLAN is preferably associated with a corresponding numeric identifier or designation and, for convenience, may be further identified by a color code (e.g., red, blue, green, yellow, etc.). The IEEE 802.1Q standard, for example, allocates the numeric identifiers 0–4095 as possible VLAN designations. In accordance with the IEEE standard, numeric identifiers 0 and 4095 are reserved, thereby leaving 4094 available VLAN designations for assignment by the network administrator. To associate any given LAN, host, end station, server, etc. with a defined VLAN, the bridge or switch directly coupled to that LAN, host, end station, server etc. preferably associates its corresponding access port with the respective VLAN designation. For example, LANs 202, 212 and 222 may all be associated with the red VLAN by associating the respective access ports of the respective switches 230–234 with that color code. LANs 204, 210, 214 and 224 may be similarly associated with the blue VLAN. LANs 206 and 218 may be associated with the yellow VLAN, and LANs 208, 216 and 226 associated with the green VLAN.

Access switches 230–234 and backbone switches 236–246 are further configured to tag, distribute and ultimately deliver VLAN associated messages, provided that the VLAN tag of the message matches the VLAN designation associated with the destination or target entity. In particular, switches 230–246 associate their respective trunk ports that are coupled to links 248 with the VLAN designations or domains associated with the various LANs, hosts, end stations, servers, etc. that may be reached through the respective trunk port. Those skilled in the art will understand that there are several techniques for propagating VLAN membership information across the network 200 and thereby associate trunk ports with VLAN designations. The IEEE, for example, as part of the 802.1Q standard, has defined the Generic Attribute Registration Protocol VLAN Registration Protocol (GVRP) through which intermediate devices, end stations, hosts, servers, workstations, etc. can issue and revoke declarations regarding their membership in specific VLANs. Propagation of VLAN membership information may alternatively take place through a dedicated protocol, such as the VLAN Trunk Protocol (VTP), which is described in the IEEE 802.1s Multiple Spanning Trees Draft Supplement, and is hereby incorporated by reference in its entirety. Additionally, trunk ports 254 coupled to links 248 may be configured to operate in accordance with any number of VLAN encapsulation protocols, such as the IEEE 802.1Q standard or the Inter-Switch Link (ISL) mechanism from Cisco Systems, Inc., as described in U.S. Pat. No. 5,742,604, which are both hereby incorporated by reference in their entirety.

As shown, network 200 also includes a plurality of redundant communication paths interconnecting the access switches 230–234 and backbone switches 236–246. The existence of such redundant links prevents portions of the network 200 from becoming isolated should any constituent link or device fail. Such redundancy, however, also results in the creation of loops, which, as described above, are highly undesirable. To avoid the creation of loops, switches 230–246 preferably execute a spanning tree algorithm. In particular, switches 230–246 execute the spanning tree protocol basically as described in the IEEE 802.1D Standard which is also hereby incorporated by reference in its entirety. To avoid the delays inherent in re-calculation of the spanning tree protocol, however, one or more access switches 230–234 also provides for rapid topology switching as described below.

It should be understood that the network 200 of FIG. 2 is meant for illustrative purposes only and that the present invention will operate with other network designs having possibly far more complex topologies. It will also be understood to those skilled in the art that there is no distinction from the spanning tree point of view between local and trunk ports or between point-to-point trunks or links and shared media (e.g., LANs).

Figure 3:
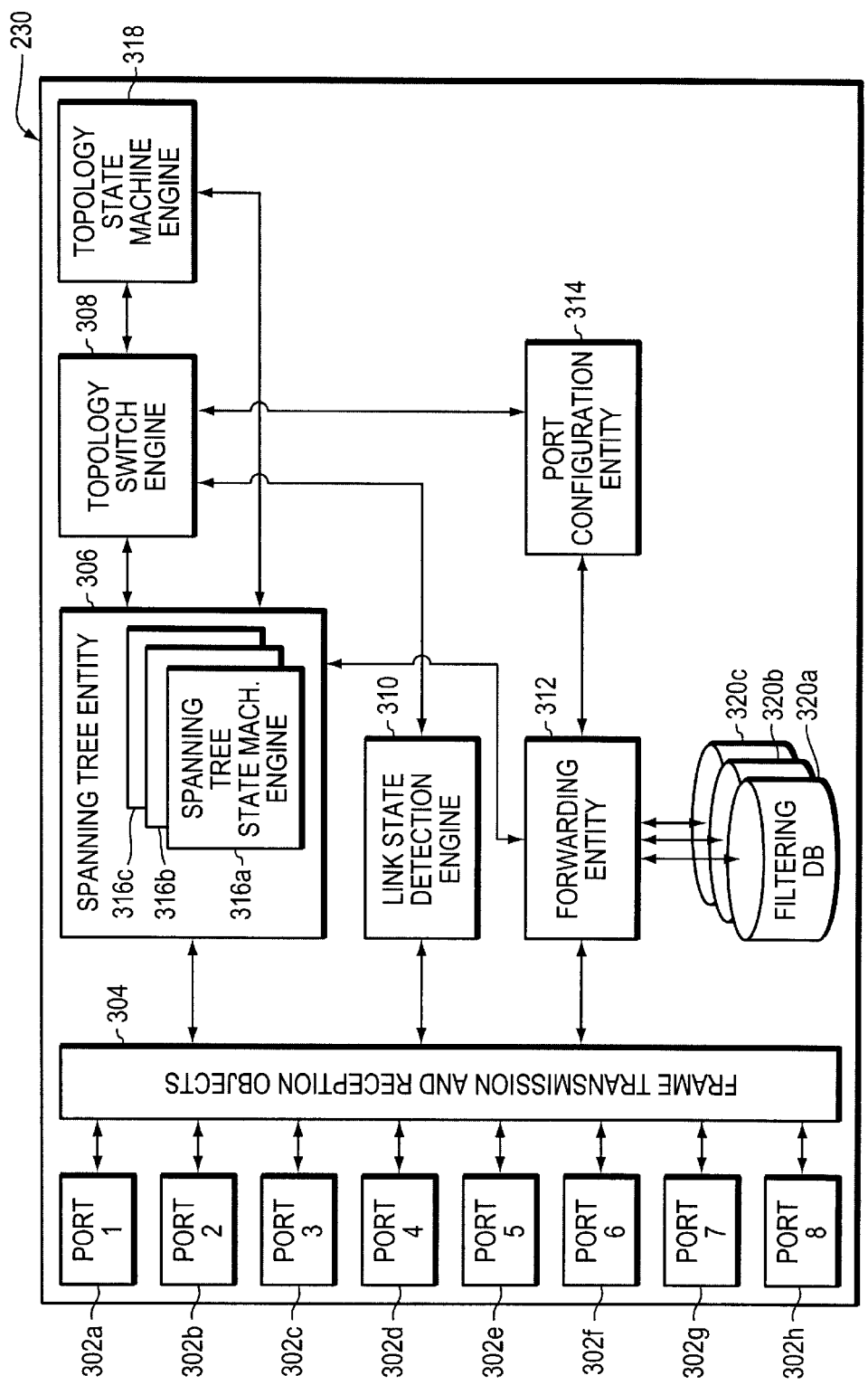
FIG. 3 is a highly schematic functional block diagram of an intermediate network device in accordance with the present invention.

FIG. 3 is a partial functional block diagram of switch 230 that is configured in accordance with the present invention. As described above, switch 230 includes a plurality of ports 302a–h, each of which is preferably identified by a number (e.g., port numbers 1–8). Ports 302a–h, moreover, are preferably configured in a conventional manner either as access ports or as trunk ports. As mentioned above, an access port is a port 302 that does not provide connectivity to other portions of the bridged network, but is instead directly connected to a LAN, host, end station, server, workstation, etc. Nonetheless, it should be understood that two switches may be interconnected by a shared media, such as LAN 220 which interconnects switches 232 and 234. A trunk port, on the other hand, typically corresponds to a point-to-point link and provides connectivity from the switch 230 to other areas of the bridged network 200. At switch 230, ports 302a–c (port numbers 1–3) are each configured as trunk ports, while ports 302d–h (port numbers 4–8), which are coupled to LANs 210, 208, 206, 204 and 202, respectively, are each configured as access ports. Trunk ports 302a–c are further configured to operate in accordance with either the 802.1 Q or ISL encapsulation techniques. The configuration of the various ports 302 as access or trunk ports may be performed by the network administrator, either remotely or locally, utilizing a conventional management protocol, such as Simple Network Management Protocol (SNMP) or Cisco-Works from Cisco Systems, Inc.

Switch 230 also includes one or more frame transmission and reception objects 304 that are in communicating relationship with the ports 302a–h such that frames received at a given port may be captured and frames to be transmitted may be driven onto a given port. Frame reception and transmission object 304 preferably includes one or more message storage structures, such as priority queues. Switch 230 further includes a spanning tree entity 306, a topology switch engine 308, a link state detection engine 310, at least one forwarding entity 312 and a port configuration entity 314. The designation of a port 302 as either an access or trunk port and the corresponding VLAN encapsulation technique are preferably stored at or by the port configuration entity 314. The spanning tree entity 306 is in communicating relationship with the frame transmission and reception object 304 so as to receive bridge protocol data unit (BPDU) messages, and also includes one or more spanning tree state machine engines 316a–c for maintaining the spanning tree states of the ports 302a–h. The topology switch engine 308, which is in communicating relationship with the spanning tree entity 306, the link state detection engine 310 and the port configuration entity 314, is coupled to or alternatively may include a topology state machine engine 318. As described below, the topology state machine engine 318 maintains the states of various loop-free topologies defined within network 200 (FIG. 2).

The forwarding entity 312 is also in communicating relation with the frame transmission and reception object 304 so as to receive and forward data frames and other messages, and is also coupled to one or more filtering databases 320a–c that store address information corresponding to the entities of network 200 (FIG. 2). Specifically, each filtering database 320, which may be implemented as a content addressable memory (CAM) device, has a plurality of records or cells (not shown), including a destination address cell, a destination port cell and a corresponding timer cell. Each record or cell in the filtering databases 320a–c preferably corresponds to a particular network entity. The forwarding entity 312 is configured to switch or bridge data frames received at a source port 302 to one or more destinations ports 302 for forwarding depending on the matching information identified in the forwarding databases 320a–c as well as the states of the respective ports 310 as established by the plurality of spanning tree state machine engines 316a–c.

Topology switch engine 308 and topology state machine engine 318 may each comprise programmed or programmable processing elements containing software programs, such as software modules or libraries, pertaining to the methods described herein and executable by one or more processing elements (not shown). Other computer readable media may also be used to store the program instructions for execution. Engines 308 and 318 may also be implemented in hardware through a plurality of registers and combinational logic configured to produce sequential logic circuits and cooperating state machines. Those skilled in the art will recognize that various combinations of hardware and software components may also be utilized to implement the topology switch components of the present invention.

Suitable intermediate network device platforms for use as access switch 230 include the Catalyst 8500® series of switch routers and/or the Catalyst® 6000 family of multi-layer switches both from Cisco Systems, Inc.

With reference to the flow charts of FIGS. 4A–B, operation of the present invention preferably proceeds as follows. First, the network administrator defines a plurality "logical" VLANs within network 200 (FIG. 2) and assigns selected network entities to these logical VLANs so as to create logical groups, as shown at block 402 of FIG. 4A. As described above, the network administrator may conceptually define the red, blue, yellow and green logical VLANs, each of which may be used to logically interconnect a different enterprise department, such as engineering, accounting, sales, and management. To define the logical VLANs and assign membership, the network manager may use a conventional Command Line Interface (CLI) or SNMP. Alternatively, the network manager may use the VLAN Membership Policy Server (VMPS) Protocol and the VLAN Director interface from Cisco Systems, Inc.

Each logical VLAN is then associated or augmented with one or more "physical" VLANs. More specifically, for each logical VLAN, the network administrator preferably defines a set of physical VLANs for association with the given logical VLAN, as indicated at block 404. In the preferred embodiment, each physical VLAN is assigned a different numerical identifier as provided in the 802.1Q standard, which is hereby incorporated by reference in its entirety, and thus basically represents its own independent VLAN. For example, the network administrator may define the violet, purple, magenta and orange physical VLANs and associate each of them with the red logical VLAN. In accordance with the 802.1Q standard, these physical VLANs may be assigned the numerical identifiers 10, 11, 12 and 13, respectively. For the blue logical VLAN, the network administrator may define the brown, rose and gray physical VLANs, which may be assigned the numerical identifiers 14–16, respectively. For the yellow logical VLAN, the network administrator may define the cyan, crimson, silver and sea green physical VLANs, which, in turn, may be assigned numerical identifiers 17–20. For the green logical VLAN, the network administrator may define the turquoise, white and olive physical VLANs, which may be assigned numerical identifiers 21–23.

The identity of the logical and physical VLANs and the association of physical VLANs to logical VLANs, as established by the network administrator, are preferably stored at or by the topology state machine engine 318. In addition, the topology switch engine 308 preferably informs the forwarding entity 312 of the identities of the physical VLANs as they are defined, and the forwarding entity 312, in turn, establishes a separate filtering database 320 for each physical VLAN.

Next, a loop-free topology is established for each physical VLAN, as shown at block 406. Those skilled in the art will understand that there are several mechanisms or techniques available to establish separate loop-free topologies for each physical VLAN. For example, the network administrator may manually define the loop-free topology for each physical VLAN. The network administrator may interact with a graphical user interface that displays a map of the network and utilize CLI or SNMP to manually establish the loop-free topologies of the physical VLANs. Conventional network management facilities, such as HP OpenView® from Hewlett-Packard Co. of Palo Alto, Calif. or NetView 6000 from International Business Machines Corp. of Armonk, N.Y., are capable of displaying such network maps. The port states (i.e., blocked or forwarding) associated with each manually defined loop-free topology are then stored at or by the respective spanning tree state machine engines of each switch, such as engines 316 of switch 230. Alternatively, the network administrator may rely on the execution spanning tree protocol to define the loop-free topologies associated with the physical VLANs. More specifically, switches 230–246 may be configured to generate, exchange and process BPDU messages that are tagged with the designations of the physical VLANs, thereby defining a loop-free topology for each physical VLAN. In particular, the network administrator may configure the spanning tree entity at each switch to establish a spanning tree state machine engine for each physical VLAN.

Those skilled in the art will understand that other mechanisms may be used to define the loop-free topologies. For example, the intermediate network devices could run a link state advertisement protocol, such as the one utilized in the well-known Open Shortest Path First routing protocol, to capture the topology of the network. Once the topology is discovered, a network administrator could use graph algorithms to determine which ports to block for each physical VLAN.

Regardless of the manner by which the loop-free topologies are defined, the set of physical VLANs associated with each logical VLAN are preferably configured and established so that, for every link 248 of network 200, there is at least one physical VLAN within that set whose loop-free topology has that link 248 in the blocked state. For example, the loop-free topology established for a first physical VLAN may have the link between switches 238 and 244 blocked, whereas the loop-free topology established for a second physical VLAN may have the link 248 between switches 240 and 246 blocked and so on until every link 248 of network 200 is blocked by at least one loop-free topology. The number of physical VLANs that are required to meet this goal can be defined by the following equation:

$$X = \left\lceil \frac{M}{M - N + 1} \right\rceil$$

where,

X is the number of physical VLANs that are required;

M is the number of links or trunks within the network;

N is the number of nodes (i.e., bridges and switches) within the VLAN bridged network; and the half parentheses symbol on the right side of the equation means a "ceiling of" function is to be applied to the real number inside the half parentheses, thereby obtaining an integer for X, such that the integer X is the smallest integer that satisfies the equation X ≧ the real number inside the half parenthesis, e.g., if the real number inside the half parentheses is 3.675, then X is 4, if the real number is 2.0001, then X is 3, etc.

In order to force or constrain the spanning tree protocol to define loop-free topologies having the desired properties (i.e., the blocking of each network link by at least one physical VLAN), the network administrator preferably modifies the bridge identifiers and port costs of the various switches 230–246 within network 200 for each physical VLAN so that the resulting loop-free topologies will block the desired links 248. A mechanism for adjusting the bridge identifier and port costs on a VLAN-by-VLAN basis is described in U.S. patent application Ser. No. 08/998,412 entitled, FAST RECONFIGURATION OF SPANNING TREES, filed Dec. 24, 1997, which is hereby incorporated by reference in its entirety. For each switch 230–246, the network administrator can adjust the bridge identifier, which is utilized to elect the root, and port costs and port identifiers, which are used to determine the lowest cost path to the root. In general, the network administrator may adjust the bridge identifiers of switches 230–246 so as to force the election of a selected root for a first physical VLAN, and then observe which links are blocked and which are forwarding. The blocked links will typically be those links that are distant from the root. The root for a second physical VLAN is then selected in proximity to the blocked links of the first physical VLAN in a similar manner (e.g., by adjusting the bridge identifiers of switches 230–246). This will typically result in the blocked links of the second physical VLAN generally corresponding to the forwarding links of the first physical VLAN. This process is then repeated several times, with adjustments made to port costs as necessary, to achieve the desired result (i.e., each link being blocked for at least one physical VLAN).

Those skilled in the art will understand that this may be done manually by the network administrator or automated with a dedicated protocol or algorithm. It may also be bounded to the discovery of the network topology as described above.

If the network administrator is relying on the spanning tree protocol to define the loop-free topology of each physical VLAN, then the spanning tree entity 306 begins formulating and transmitting BPDU messages tagged with the VLAN designations for each physical VLAN upon initialization of the respective switch. In particular, the spanning tree entity 306 preferably formulates and transmits BPDU messages that have been tagged with the VLAN designations corresponding to violet, purple, magenta, orange, brown, rose, etc. physical VLANs. These tagged BPDU messages are received and processed by the switches 230–246 as described above. The spanning tree state machine engines 316 then transition the port states on a per-VLAN basis. Thus, a separate loop-free topology is defined by the respective spanning tree entities for each physical VLAN.

Figures 5A, 5B, 5C:
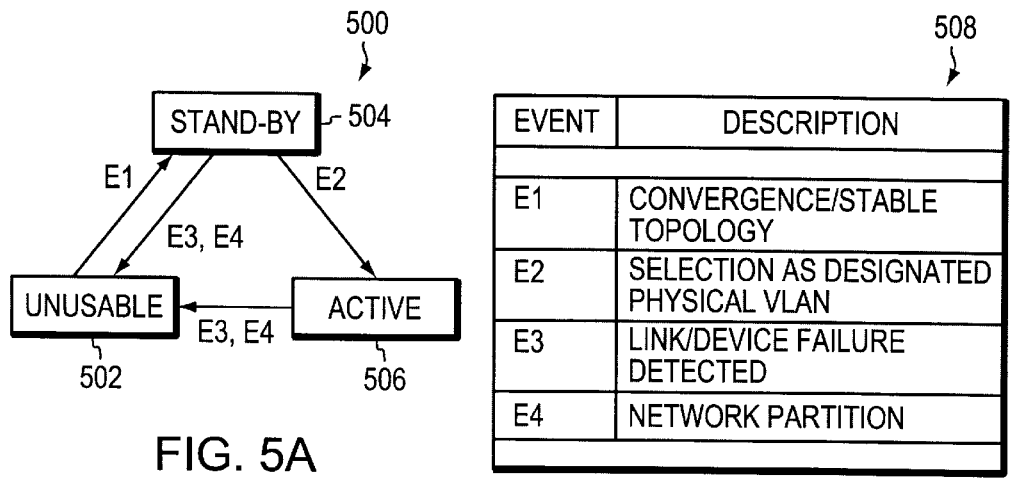
FIG. 5A is a state diagram in accordance with the present invention.
FIG. 5B is a chart illustrating the events that trigger a transition among the states of FIG. 5A.
FIG. 5C is a highly schematic representation of state information stored by the device of FIG. 3.

The topology state machine engine 318, which maintains a corresponding spanning tree state for each physical VLAN, preferably monitors the execution of the spanning tree protocol by the spanning tree entity 306. FIG. 5A is a state diagram 500 of the various states of the loop-free topologies represented by the physical VLANs defined within network 200. As shown, the loop-free topology for each physical VLAN may be in one of three possible states: an unusable state 502, a stand-by state 504 and an active state 506. The unusable state 502 corresponds to a loop-free topology that has not yet converged (e.g., one or more switch ports are in the listening or learning states) or has become partitioned (e.g., connectivity has been lost with part of the physical VLAN domain). The stand-by state 504 corresponds to a loop-free topology that has converged (e.g., all corresponding switch ports are either in the blocked, forwarding or disabled states) and thus represents a stable topology. The active state 506 corresponds to a loop-free topology that has been designated to carry the traffic for the respective logical VLAN, as described below. Only one physical VLAN (i.e., one loop-free topology) may be designated to carry traffic for its logical VLAN at any given time.

FIG. 5B is a list of events 508 that may cause a transition among the states of the state diagram of FIG. 5A. In particular, event E1 corresponds to a loop-free topology converging, and thus results in a transition from the unusable state 502 to the stand-by state 504. Event E2 corresponds to a particular physical VLAN being selected as the designated VLAN for its respective logical VLAN, and thus results in a transition from the stand-by state 504 to the active state 506. Event E3 corresponds to the detection of a link or device failure in a previously stable topology, and thus causes a transition from either the active state 506 or the stand-by state 504 to the unusable state 502. Similarly, event E4 corresponds to a partition in the respective physical VLAN, and thus also causes a transition from either the active state 506 or the stand-by state 504 to the unusable state 502.

FIG. 5C is a highly schematic representation of information arranged as an array or table 510 that is stored at or by the topology state machine engine 318. Table 510 contains a first column 512 that identifies each of the logical VLANs of which switch 230 is aware (e.g., red, blue, yellow and green). For each logical VLAN, the table 510 also includes a second column 514 that identifies the physical VLANs associated with each logical VLAN by their numeric identifiers. Following the above example, the red logical VLAN is associated with the violet, purple, magenta and orange physical VLANs, the blue logical VLAN is associated with the brown, rose and gray physical VLANs, the yellow logical VLAN is associated with the orange, crimson, silver and sea green physical VLANs and so on. Table 510 further includes a third column 516 that specifies the current state of the loop-free topology established for each physical VLAN. As indicated above, a loop-free topology may be in any one of three possible states: unusable, active and stand-by.

In the preferred embodiment, whenever a loop-free topology transitions to the stand-by state, the topology switch engine 308 directs the forwarding entity 312 to purge (e.g., delete) the contents of the respective filtering database for that loop-free topology. For example, when the orange physical VLAN which is associated with the red logical VLAN enters the stand-by state as shown in FIG. 5C, the filtering database 320 that corresponds to the orange physical VLAN is purged. As described below, the to purging of stand-by filtering databases facilitates the rapid transition to a stand-by physical VLAN upon the occurrence of a failure in the active physical VLAN.

Figure 4A:
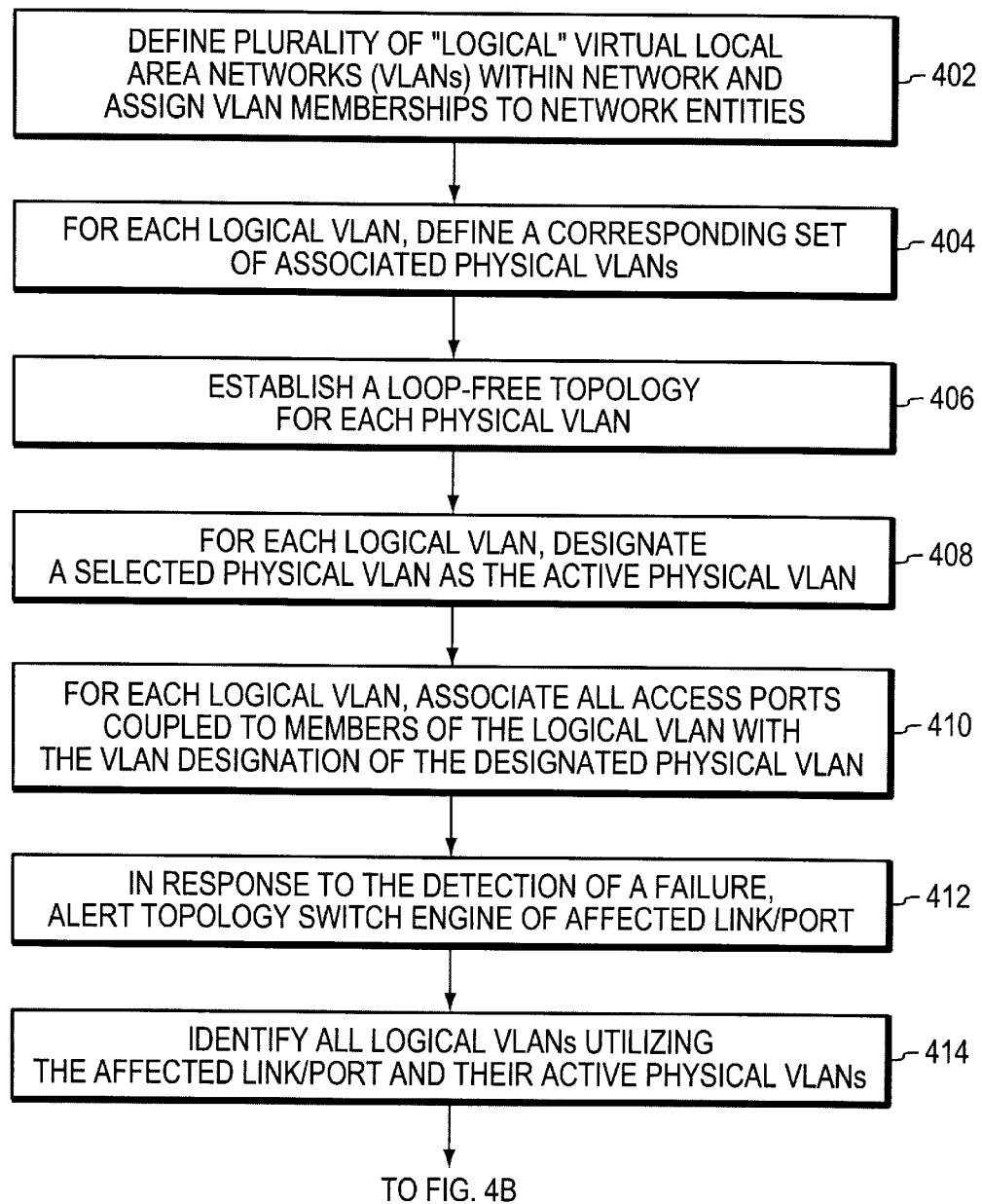
FIGS. 4A–4B is a flow diagram of the methods of the present invention.

In order to begin forwarding messages associated with a logical VLAN, the topology switch engine 308 designates a selected physical VLAN as the active physical VLAN for each logical VLAN, as indicated at block 408 (FIG. 4A). The designation of is a selected physical VLAN may occur in several ways. For example, the topology switch engine 308 may select the first physical VLAN that converges and thus transitions to the stand-by state. An alternative approach is to select the physical VLAN having the lowest (or highest) numerical identifier. Upon designating a selected physical VLAN, the topology switch engine 308 preferably informs the topology state machine engine 318 of the designation, which, in turn, transitions the state of the designated physical VLAN to active, thereby signifying that it has become the designated physical VLAN for this logical VLAN. The topology switch engine 308 also informs the port configuration entity 314 of the selection of a designated physical VLAN. In response, the port configuration entity 314 associates each access port 302*d*–302*h* that is directly coupled to members of the logical VLAN with the designated physical VLAN, as indicated at block 410. For example, suppose the purple physical VLAN is selected as the designated VLAN for the red logical VLAN. In response, its state transitions to active and the port configuration entity 314 associates all access ports directly coupled to members of the red logical VLAN (e.g., port 302*h*) with the purple physical VLAN. This process is repeated at all access switches 230–234 so that access ports coupled to all members of the red logical VLAN are associated with the purple VLAN designation (i.e., numeric identifier 11).

Figure 1:
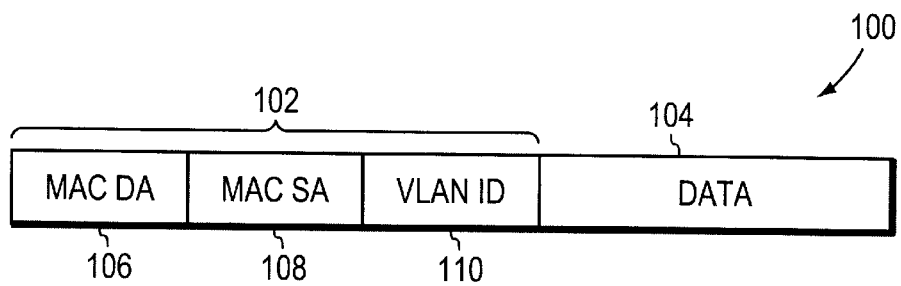
FIG. 1, previously discussed, is a block diagram of a conventional VLAN-tagged message.

Thereafter, traffic (e.g., data frames) received at an access port for forwarding on a trunk port are tagged with the physical VLAN that has been associated with that access port. Continuing with the above example, since access port 302*h* (port number 8) corresponds to the red logical VLAN, and the purple physical VLAN has been selected as the designated VLAN for this logical VLAN, then port configuration entity 314 associates port 302*h* with the purple VLAN. As a result, a message from server 258 is received at port 302*h* (port number 8), captured and handed to the forwarding entity 312 for processing. Forwarding entity 312 in cooperation with the port configuration entity 314 determines that the message has been received on an access port that is associated with the purple physical VLAN. In response, the forwarding entity 312 performs a look-up on the filtering database 320 associated with the purple physical VLAN, using the contents of the MAC DA field of the received message. If the message is to be forwarded on a trunk port (e.g., port 302*b*), the forwarding entity 312 appends a VLAN ID field 110 (FIG. 1) to the message, loads the purple physical VLAN's numeric identifier therein and drives the message onto port 302*b* for forwarding.

Similarly, suppose a message 100 (FIG. 1) is received at switch 230 on a trunk port, such as port 302*b*, that carries the purple VLAN designation in its VLAN ID field 110 and is addressed to server 258. Forwarding entity 312 preferably uses the contents of the MAC DA field 106 to perform a look-up on the filtering database 320 for the purple VLAN. The look-up will identify port 302*h* (port number 8) which is coupled to server 258. Since this is an access port, forwarding entity 312 strips off the VLAN ID field 110 and drives the un-tagged message onto port 302*h* for delivery to server 258.

Significantly, the present invention allows switch 230 to continue forwarding traffic with little or no disruption despite link or device failures. For example, suppose as described above, that the purple physical VLAN has been selected as the designated VLAN for the red logical VLAN. Furthermore, suppose that execution of the spanning tree protocol by the spanning tree state machine engine 316 for the purple physical VLAN results in ports 302*a* and 302*c* (port numbers 1 and 3) being blocked and port 302*b* (port number 2) forwarding. As described above, traffic received at switch 230 on access port 320*h* (port number 8) and thus corresponding to the red logical VLAN is tagged with the purple physical VLAN designation (i.e., numerical identifier 11) by the forwarding entity 312 and forwarded through trunk port 302*b*. If link 248 coupled to port 302*b* fails, the failure is detected by the link state detection engine 310, and it, in response, alerts the topology switch engine 308, as indicated at block 412 (FIG. 4A). The topology switch engine 308 informs the topology state machine engine 318 of the failure, and in cooperation with state machine engine 318 identifies all of the logical VLANs that are utilizing the affected port or link, as indicated at block 414. The topology state machine engine 318 treats the failure as an E1 event and, accordingly, transitions the affected physical VLAN (i.e., purple) to the unusable state, as indicated at block 416 (FIG. 4B) and as illustrated by the arrow indicating a transition from the active to the unusable state for entry 518 of table 510 (FIG. 5C). Although, for purposes of explanation, table 510 illustrates the transition between states, it should be understood that table 510 preferably only stores the current state of each physical VLAN (e.g., active, unusable or stand-by) and not the transition between two states.

The topology switch engine 308 next proceeds to identify a back-up physical VLAN for each logical VLAN affected by the failure, as indicated at block 418. Specifically, topology switch engine 308 identifies a physical VLAN that is in the stand-by state and that also has the affected port or link blocked. As described above, the spanning tree entity 306 has been configured to define a loop-free topology for every physical VLAN. The physical VLANs and thus the loop-free topologies, moreover, have been established such that, for every link 248 in network 200, there is at least one physical VLAN for every logical VLAN whose loop-free topology has that link blocked. Thus, there is at least one physical VLAN associated with the red logical VLAN whose loop-free topology has port 302*b* blocked. Suppose that the topology switch engine 308 identifies the orange physical VLAN (numerical identifier 13) as having port 302*b* in the blocked state. Topology switch engine 308 selects the orange physical VLAN as the newly designated physical VLAN for the red logical VLAN. In response, the topology state machine engine 318 transitions the state of this physical VLAN from stand-by to active, shown at block 420 (FIG. 4B) and as illustrated by the arrow indicating a transition from the stand-by to the active state in entry 520 of table 510 (FIG. 5C).

Next, the entire membership of the red logical VLAN within the network 200 is switched from the purple physical VLAN to the orange physical VLAN, as indicated at block 422. More specifically, topology switch engine 308 informs the port configuration entity 314 of the designation of the orange physical VLAN as the newly active VLAN for the red logical VLAN. In response, the port configuration entity 314 changes the VLAN association of each access port coupled to members of the red is logical VLAN from the purple VLAN (numerical identifier 11) to the orange VLAN (numerical identifier 13). Thus, all the LANs, hosts, end stations, servers, workstations, etc. that were associated with the purple physical VLAN at switch 230 are now associated with the orange physical VLAN. It should be understood that the re-assignment of access ports from one physical VLAN designation to another can be rapidly accomplished (e.g., in a mater of milliseconds). It should be further understood that the assignment of physical VLANs at the trunk ports is left unchanged despite the failure. That is, only the VLAN assignment of the access ports (which are directly coupled to VLAN member entities) is changed.

Figure 6:
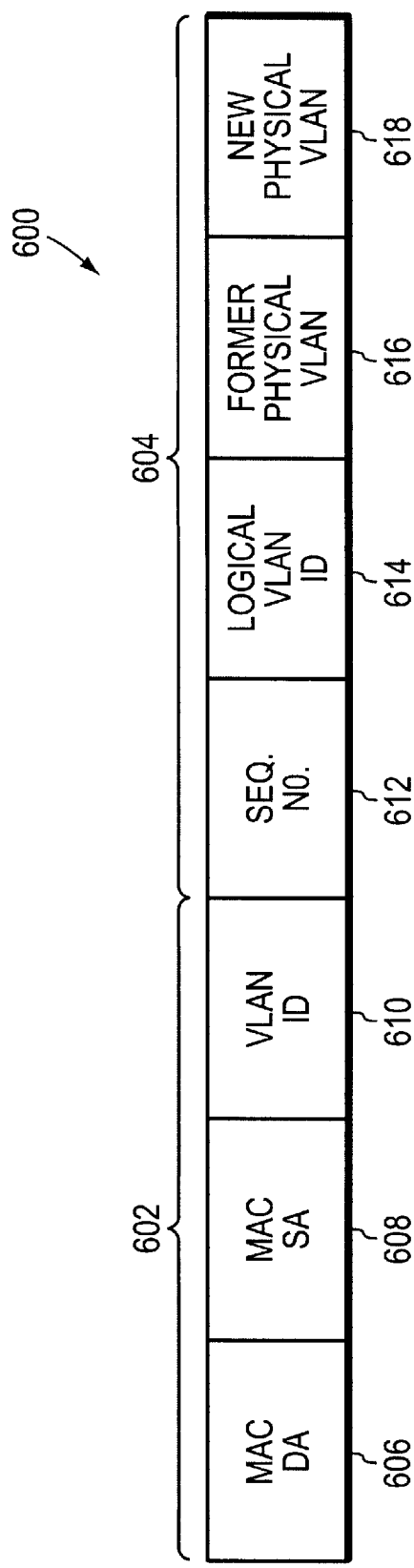
FIG. 6 is a highly schematic block diagram of a notification message in accordance with the present invention.

In order to alert the other switches within network 200 of this change in physical VLANs and thereby complete the switch to the new physical VLAN, the topology switch engine 308 generates and sends one or more notification messages to the other switches within network 200, as indicated at block 424. The notification messages, which are transmitted by a reliable broadcast mechanism, alert these switches of the change affecting the red logical VLAN. FIG. 6 is a highly schematic block diagram of a preferred notification message 600. Message 600 includes a header portion 602 that is compatible with the MAC sub-layer, and a message area 604. The header 602 includes a MAC SA field 608 and a MAC DA field 606 and a VLAN ID field 610. The message area 604 includes a sequence number field 612, a logical VLAN ID field 614, a former physical VLAN ID field 616 and a newly active VLAN ID field 618. Those skilled in the art will understand that notification message 600 may include additional fields such as type fields, length fields, version fields, etc. Topology switch engine 308 preferably loads the bridge ID for switch 230 in the MAC SA field 608 a group multicast address in the MAC DA field 606 and places the VLAN ID for the old physical VLAN in field 610. In message area 604, topology switch engine 308 enters a selected sequence number in field 612, the identifier of the affected logical VLAN (e.g., red) in field 614, the identifier of the former physical VLAN (e.g., purple) in field 616 and the identifier of the newly activated physical VLAN (e.g., orange) in field 618. Switch 230 then forwards the notification message 600 out each of its trunk ports that are in the forwarding state for any VLAN.

The notification message 600 is received at each of the neighboring switches (i.e., switches 236 and 240) and, by virtue of the selected group multicast address, it is captured and forwarded to the topology switch engines at those devices. The topology switch engines at switches 236 and 240 store the sequence number of message 600. Switches 236 and 240 forward a copy of the notification message 600 from each of their trunk ports that are in the forwarding state (other than the port on which the message 600 was received) and may return an acknowledgement to switch 230. As a result, notification message 600 is propagated throughout the network 200 and received at each access switch coupled to members of the red logical VLAN. At each switch, the notification message 600 is passed to the topology switch engine at that device. The topology switch engine, in cooperation with the port configuration entity, determines whether there are any access ports presently associated with the physical VLAN identified in the old active VLAN ID field 616 (e.g., purple), and, if so, switches (i.e., changes or re-assigns) those ports to the physical VLAN identified in the newly active VLAN ID field 618 (e.g., orange). The switch also purges the contents of the filtering database associated with the newly active physical VLAN. Thereafter, traffic received on an access port that was associated and tagged with the purple physical VLAN is now associated and tagged with the orange VLAN.

It should be understood that switch 230 may send multiple copies of the notification message 600, using the same sequence number, to ensure that they are received. The sequence number is used by receiving switches to discard any duplicate copies of the message 600. It should be further understood that switch 230 may alternatively use a message format and mechanism that is similar to the TCN-PDU messages of the spanning tree protocol to disseminate changes in physical VLANs or may use the VTP protocol to alert other switches of the change in physical VLANs for the red logical VLAN.

Figure 4B:
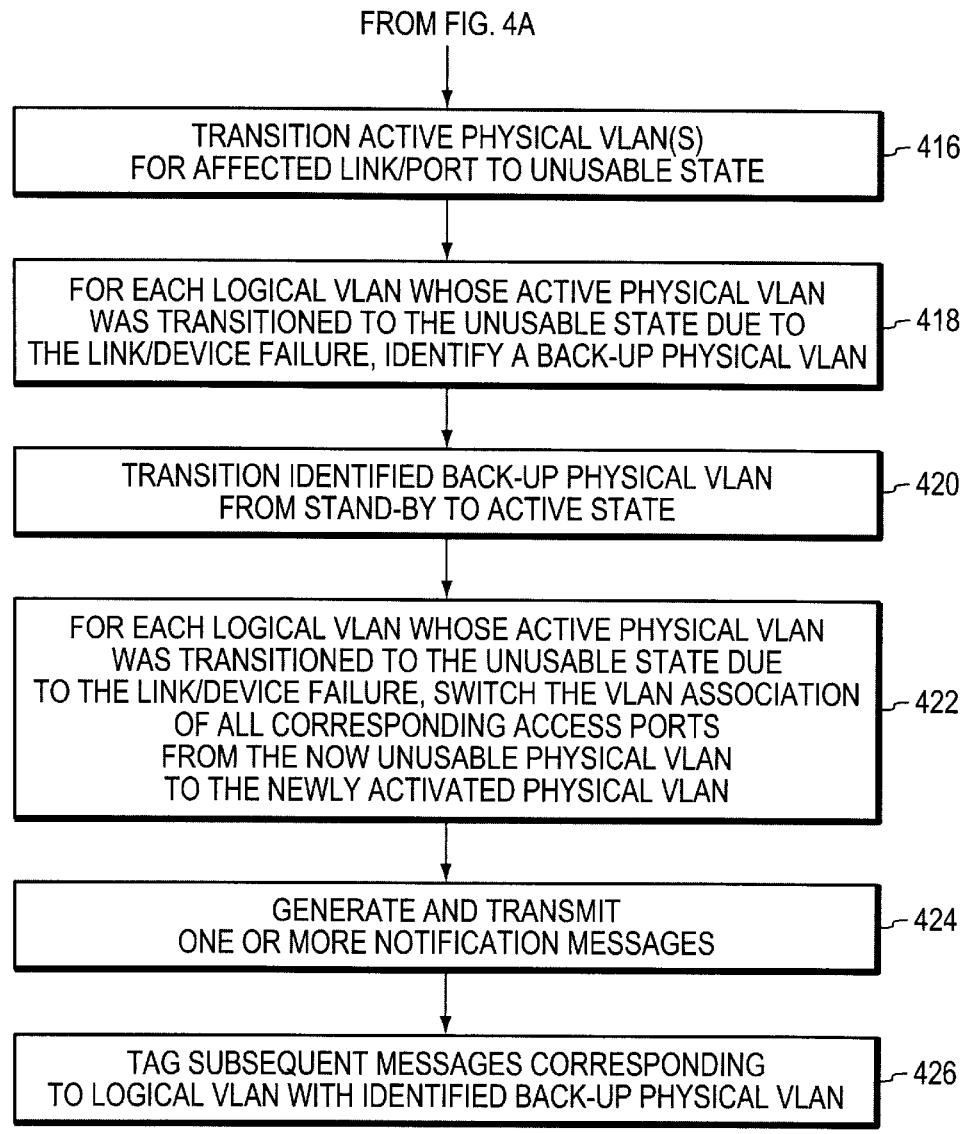

Upon receiving the acknowledgements confirming that the notification message 600 has been received by its neighbors, switch 230 is free to begin tagging and forwarding traffic for the red logical VLAN with the newly designated orange physical VLAN designation, as indicated at block 426 (FIG. 4B). Switch 230 utilizes the filtering database 320 corresponding to the orange physical VLAN to render forwarding decisions for messages associated with the red logical VLAN. As described above, the filtering database 320 for the orange physical VLAN was purged when the respective loop-free topology entered the stand-by state, thereby ensuring it does not contain any stale information when forwarding entity 312 begins to utilize it.

It should be understood that the filtering database of the selected physical VLAN could be purged at the time the time the respective loop-free topology transitions from stand-by to active. It should also be understood that switch 230 may begin forwarding messages associated with the red logical VLAN along the newly selected physical VLAN before receiving acknowledgements from its neighbors.

Topology switch engines 308 also preferably implement one or more tie-breaking rules to resolves any conflicts in the designation of physical VLANs to logical VLANs. More specifically, suppose the same failure affecting a first logical VLAN is detected at two switches, and suppose further that the first logical VLAN is currently associated with a first physical VLAN. The first switch may decide to switch the first logical VLAN to a second physical VLAN, while the second switch may decide to switch the same logical VLAN to a third physical VLAN. To resolve such conflicts, the topology switch engines 308 preferably apply a tie-breaking rule. For example, the topology switch engines 308 may adopt the physical VLAN having the lowest (or highest) numerical identifier, based on the notification messages received from the first and second switches. During this resolution phase, other switches may first switch to an intermediate physical VLAN before converging on the same physical VLAN.

It should be understood that each logical VLAN may also have its own VLAN numeric identifier as provided by the IEEE 802.1Q standard, and that this numeric identifier may be used as the initial physical VLAN for that logical VLAN.

The foregoing description has been directed to specific embodiments of this invention. It will be apparent, however, that other variations and modifications may be made to the described embodiments, with the attainment of some or all of their advantages. For example, although it is preferred that the set of physical VLANs established for a given logical VLAN be defined and configured so as to block every link of the network, the invention can be implemented with fewer physical VLANs. That is, even with less than an otherwise full complement of physical VLANs, the present invention nevertheless provides substantial improvements in quickly recovering from failures. In addition, rather than purging the contents of the filtering database when the respective physical VLAN is elected as the new active physical VLAN, the filtering database of the old, now unusable physical VLAN may be purged following its transitioning to the unusable state. Therefore, it is the object of the appended claims to cover all such variations and modifications as come within the true spirit and scope of the invention.

What is claimed is:

1. A method for use in an intermediate network device configured to forward messages in a computer network, the method comprising the steps of:

establishing one or more logical virtual local area networks (VLANs) at the intermediate network device;

defining a set of physical VLANs for each logical VLAN, each physical VLAN having an identifier;

for each physical VLAN, establishing a corresponding loop-free topology within the computer network;

for a given logical VLAN, designating a first physical VLAN of the set and its respective loop-free topology for tagging and forwarding messages associated with the given logical VLAN;

detecting a failure in the loop-free topology of the first physical VLAN; and in response to the step of detecting, switching the given logical VLAN from the first physical VLAN to a second physical VLAN for use in tagging and forwarding messages associated with the given logical VLAN.

2. The method of claim 1 wherein the intermediate network device includes a plurality of ports that transition among a plurality of spanning tree port states, including one or more transitory states and one or more stable states and further wherein all spanning tree port states for the second physical VLAN are in the stable state, thereby allowing the intermediate network device to rapidly resume forwarding messages associated with the given logical VLAN.

3. The method of claim 1 further comprising the step of generating for transmission one or more notification messages from the intermediate network device, the one or more notification messages identifying the given logical VLAN and including the identifiers of the first and second physical VLANs.

4. The method of claim 3 further comprising the step of, in response to receiving the one or more notification messages at a second intermediate network device, switching the given logical VLAN from the first physical VLAN to the second physical VLAN.

5. The method of claim 1 further comprising the step of establishing a separate filtering database for each physical VLAN, each filtering database storing address information of entities disposed within the computer network.

6. The method of claim 1 further comprising the step of transitioning each physical VLAN among one of unusable, stand-by or active states, whereby the unusable state corresponds to the loop-free topology of the respective physical VLAN not being converged, the stand-by state corresponds to the loop-free topology of the respective physical VLAN reaching convergence, and the active state corresponds to the respective physical VLAN being designated for its corresponding logical VLAN.

7. The method of claim 6 further comprising, in response to the step of detecting, the steps of:

transitioning the state of the first physical VLAN to the unusable state; and transitioning the state of the second physical VLAN to the active state.

8. The method of claim 1 wherein the computer network has a plurality of trunk links and the set of physical VLANs for the given logical VLAN are defined so that each trunk link of the computer network is blocked by the loop-free topology established for at least one of the physical VLANs.

9. The method of claim 8 wherein the intermediate network device has one or more ports coupled to one or more respective trunk links and the detected failure affects the forwarding of messages on a particular trunk link, further wherein the second physical VLAN has the particular trunk link blocked.

10. The method of claim 1 wherein the step of establishing comprises the step of executing a spanning tree protocol on a per-VLAN basis so as to define the corresponding loop-free topologies.

11. The method of claim 1 wherein the step of establishing comprises the step of manually defining the corresponding loop-free topologies.

12. An intermediate network device having a plurality of ports for forwarding messages in a computer network in which a plurality of logical virtual local area networks (VLANs) are defined each having one or more members, the intermediate network device comprising:

a topology switch engine configured to associate each logical VLAN with a set of physical VLANs each having its own identifier, and to designate one physical VLAN from the respective set for each logical VLAN;

means for establishing a loop-free topology within the computer network for each physical VLAN;

a port configuration entity in communicating relationship with the topology switch engine, the port configuration entity configured to associate each port directly coupled to members of a first logical VLAN with the identifier of the designated physical VLAN for the first logical VLAN; and a link state detection engine coupled to the ports and in communicating relationship with the topology switch engine, the link state detection engine configured to detect failures at the ports, whereby, in response to the detection of a failure at a port affecting the forwarding of messages for the first logical VLAN, the topology switch engine selects a back-up physical VLAN for the first logical VLAN and directs the port configuration entity to switch the association of each port directly coupled to members of the first logical VLAN to the back-up physical VLAN.

13. The intermediate network device of claim 12 further comprising means for tagging and forwarding messages from members of the first logical VLAN with the identifier of the associated physical VLAN.

14. In an intermediate network device configured to forward messages in a computer network in which a plurality of logical virtual local area networks (VLANs) are defined, a set of physical VLANs are defined for each logical VLAN, each physical VLAN having an identifier, and a loop-free topology is established within the network for each physical VLAN, a computer readable medium containing executable program instructions for switching the logical VLANs from between different loop-free topologies, the executable program instructions comprising program instructions for:

for a given logical VLAN, designating a first physical VLAN and its respective loop-free topology for tagging and forwarding messages associated with the given logical VLAN;

detecting a failure in the loop-free topology of the first physical VLAN; and in response to the step of detecting, switching the given logical VLAN from the first physical VLAN to a second physical VLAN.

15. The computer readable medium of claim 14 further comprising a program instruction for transitioning each physical VLAN among one of unusable, stand-by or active states, whereby the unusable state corresponds to the loop-free topology of the respective physical VLAN not being converged, the stand-by state corresponds to the loop-free topology of the respective physical VLAN reaching convergence, and the active state corresponds to the respective physical VLAN being designated for its corresponding logical VLAN.

16. The computer readable medium of claim 15 further comprising, in response to the step of detecting, the programs instructions for:

transitioning the state of the first physical VLAN to the unusable state; and transitioning the state of the second physical VLAN to the active state.

17. The computer readable medium of claim 14 wherein the computer network has a plurality of trunk links and each trunk link is blocked by the loop-free topology of at least one of the physical VLANs, the intermediate network device has one or more ports coupled to one or more respective trunk links and the detected failure affects the forwarding of messages of the given logical VLAN on a particular trunk link, further wherein the program instruction for switching provides that the second physical VLAN has the particular trunk link blocked.

18. In an intermediate network device configured to forward messages in a computer network in which a plurality of logical virtual local area networks (VLANs) are defined, a method for switching the logical VLANs between different loop-free topologies, the method comprising the steps of:

defining a set of physical VLANs for each logical VLAN, each physical VLAN having an identifier;

for each physical VLAN, establishing a corresponding loop-free topology within the computer network; and for a given logical VLAN, designating a first physical VLAN and its respective loop-free topology from the respective set for use in tagging and forwarding messages associated with the given logical VLAN.

* * * * *

UNITED STATES PATENT AND TRADEMARK OFFICE
CERTIFICATE OF CORRECTION

PATENT NO.    : 6,678,241 B1
DATED         : January 13, 2004
INVENTOR(S)   : Silvano Gai et al.

It is certified that error appears in the above-identified patent and that said Letters Patent is hereby corrected as shown below:

<u>Title page,</u>
Item [73], Assignee, delete "Cisc" and substitute therefore -- "Cisco" --

Signed and Sealed this

Ninth Day of March, 2004

JON W. DUDAS
*Acting Director of the United States Patent and Trademark Office*